US008661435B2

(12) United States Patent
Schroth et al.

(10) Patent No.: US 8,661,435 B2
(45) Date of Patent: Feb. 25, 2014

(54) SYSTEM AND METHOD FOR AFFINITY DISPATCHING FOR TASK MANAGEMENT IN AN EMULATED MULTIPROCESSOR ENVIRONMENT

(75) Inventors: David W. Schroth, Minneapolis, MN (US); Brian Garrett, Salt Lake City, UT (US); Andrew T. Jennings, Minnetonka, MN (US); Michael John Rieschi, St. Paul, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 12/886,969

(22) Filed: Sep. 21, 2010

(65) Prior Publication Data
US 2012/0072908 A1 Mar. 22, 2012

(51) Int. Cl.
*G06F 9/455* (2006.01)

(52) U.S. Cl.
USPC .............................................. 718/1; 718/102

(58) Field of Classification Search
None
See application file for complete search history.

(56) References Cited

U.S. PATENT DOCUMENTS

| | | | | |
|---|---|---|---|---|
| 4,445,177 A * | 4/1984 | Bratt et al. | ..................... | 712/245 |
| 6,996,822 B1 * | 2/2006 | Willen et al. | ................. | 718/102 |
| 7,464,380 B1 * | 12/2008 | Hempel | ........................ | 718/102 |
| 8,201,165 B2 * | 6/2012 | Nair | ................................. | 718/1 |
| 8,230,425 B2 * | 7/2012 | Ahuja et al. | ................... | 718/102 |
| 2004/0054999 A1* | 3/2004 | Willen et al. | ................. | 718/103 |
| 2005/0080982 A1* | 4/2005 | Vasilevsky et al. | .............. | 711/1 |
| 2008/0163203 A1* | 7/2008 | Anand et al. | ...................... | 718/1 |
| 2010/0223618 A1* | 9/2010 | Fu et al. | ......................... | 718/102 |
| 2011/0145505 A1* | 6/2011 | Anand et al. | ................... | 711/130 |
| 2011/0179416 A1* | 7/2011 | Patale et al. | ........................ | 718/1 |

* cited by examiner

*Primary Examiner* — Emerson Puente
*Assistant Examiner* — Mehran Kamran
(74) *Attorney, Agent, or Firm* — Richard J. Gregson (57) ABSTRACT

The disclosure relates generally to managing assignment of tasks among instruction processors (IPs) within a computer system having multiple IPs, and more particularly to binding emulated IPs with a host system's IPs (e.g., processor cores) for facilitating control over affinity-based assignment of tasks among the host system's IPs by a task manager (e.g., OS) that is executing on the emulated IPs, rather than running directly on the host system's IPs. Certain embodiments provide techniques for binding emulated IPs with actual IPs of a computing system that is hosting the emulated IPs, thereby enabling better control of management of the system by a task manager executing on the emulated IPs. For instance, in certain embodiments, a dispatcher (e.g., of an OS running on emulated IPs) performs affinity-based management of task assignment for tasks performed for an application program among IPs of a host system that is hosting the emulated IPs.

16 Claims, 7 Drawing Sheets

SYSTEM AND METHOD FOR AFFINITY DISPATCHING FOR TASK MANAGEMENT IN AN EMULATED MULTIPROCESSOR ENVIRONMENT

TECHNICAL FIELD

The below description relates generally to the field of managing assignment of tasks among instruction processors (IPs) within a computer system having multiple IPs, and more particularly to binding emulated IPs with a host system's IPs (e.g., processor cores) for facilitating control over affinity-based assignment of tasks among the host system's IPs by a task manager, such as a dispatcher within an operating system (OS), that is executing on the emulated IPs.

BACKGROUND

Task Dispatchers.

Various dispatchers and dispatching techniques have been developed for assigning tasks based on affinity with a processor or processor group in multiprocessor systems. In the field of multiprocessor computer systems, it is often desirable to intelligently assign tasks (e.g., that are to be performed for one or more application programs executing on the system) to particular one(s) of the processors in an effort to improve efficiency and minimize overhead associated with performing the tasks. For instance, as discussed further herein, it is often desirable to assign tasks that are most likely to access the same data to a common processor or processor group to take advantage of cache memory of the processors. For instance, by assigning tasks to the processor or processor group that has the most likely needed data already in local cache memory(ies), efficiencies may be gained.

It can be difficult to strike the right balance of work assignments between and among the processors of a multiprocessor system so that the computing tasks are accomplished in an efficient manner with a minimum of overhead. This appropriate balance may vary considerably depending on the needs of the system's users and to some extent upon the system architectures. It is often desirable to manage the assignment of tasks in a manner that does not require a majority of the available tasks to be assigned to a single processor (nor to any other small subset of all processors). If such an over-assignment of tasks to a small subset of all processors occurs, the small subset of processors is kept too busy to accomplish all its tasks efficiently while others are waiting relatively idle with few or no tasks to do. Thus the system will not operate efficiently. Accordingly, a management technique that employs a load balancing or work distribution scheme is often desirable to maximize overall system efficiency. Various such load balancing and work distribution schemes have been developed and employed for scheduling tasks in multiprocessor systems.

Multiprocessor systems are usually designed with cache memories to alleviate the imbalance between high performance processors and the relatively slow main memories. Cache memories are physically closer to their processors and so can be accessed more quickly than main memory. They are managed by the system's hardware and they contain copies of recently accessed locations in main memory. Typically, a multiprocessor system includes small, very fast, private cache memories adjacent to each processor, and larger, slower cache memories that may be either private or shared by a subset of the system's processors. The performance of a processor executing a software application depends on whether the application's memory locations have been cached by the processor, or are still in memory, or are in a close-by or remote processor's cache memory.

To take advantage of cache memory (which provides for quicker access to data because of cache's proximity to individual processors or groups of processors), it may be desirable to employ a task management scheme that assigns tasks based on affinity with a processor or processor group that has the most likely needed data already in local cache memory(ies) to bring about efficiencies. As is understood in this art, where a processor has acted on part of a problem (loading a program, running a transaction, or the like), it is likely to reuse the same data or instructions present in its local cache, because these will be found in the local cache once the problem is begun. By affinity we mean that a task, having executed on a processor, will tend to execute next on that same processor or a processor with fast access to the cached data. (Tasks begun may not complete due to a hardware interrupt or for various other well-understood reasons not relevant to our discussion).

Language in the computer arts is sometimes confusing as similar terms mean different things to different people and even to the same people in different contexts. Here, we use the word "task" as indicating a process. Tasks are sometimes thought of as consisting of multiple independent threads of control any of which could be assigned to different processor groups, but we will use the word task more simply, referring generically to a particular process.

The two above-mentioned desires of affinity and load balancing seem to be in conflict. Permanently retaining task affinity could lead to overloading some processors or groups of processors. Redistributing tasks to processors to which they have no affinity will yield few cache hits and slow down the processing overall. These problems get worse as the size of the multiprocessor computer systems gets larger.

Conventionally, computer systems use switching queues and associated algorithms for controlling the assignment of tasks to processors. Typically, these algorithms are considered an Operating System (OS) function. When a processor "wants" (is ready for) a new task, it will execute the (usually) re-entrant code that embodies the algorithm that examines the switching queue. This code is commonly called a "dispatcher." It will determine the next task to do on the switching queue and do it.

While care should generally be taken in implementing a task assignment (or "scheduling") framework that strikes a desired balance between affinity and load balancing, a task assignment scheme that includes some degree of affinity management is often desirable. Exemplary dispatchers and dispatching techniques for assigning tasks based on affinity with processor(s) are described further in the following U.S. patents: 1) U.S. Pat. No. 6,658,448 titled "System and method for assigning processes to specific CPUs to increase scalability and performance of operating systems;" 2) U.S. Pat. No. 6,996,822 titled "Hierarchical affinity dispatcher for task management in a multiprocessor computer system;" 3) U.S. Pat. No. 7,159,221 titled "Computer OS dispatcher operation with user controllable dedication;" 4) U.S. Pat. No. 7,167,916 titled "Computer OS dispatcher operation with virtual switching queue and IP queues;" 5) U.S. Pat. No. 7,287,254 titled "Affinitizing threads in a multiprocessor system;" 6) U.S. Pat. No. 7,461,376 titled "Dynamic resource management system and method for multiprocessor systems;" and 7) U.S. Pat. No. 7,464,380 titled "Efficient task management in symmetric multi-processor systems," the disclosures of which are hereby incorporated herein by reference. While the above-incorporated U.S. patents disclose exemplary systems and dispatchers and thus aid those of ordinary skill in the art in understanding exemplary implementations that may be employed for assigning tasks based on affinity with processor(s), embodiments of the present invention are not limited to the exemplary systems or dispatchers disclosed therein.

Emulated Environments.

In some instances, it is desirable to emulate one processing environment within another "host" environment or "platform." For instance, it may be desirable to emulate an OS and/or one or more instruction processors (IPs) in a host system. Processor emulation has been used over the years for a multitude of objectives. In general, processor emulation allows an application program and/or OS that is compiled for a specific target platform (or IP instruction set) to be run on a host platform with a completely different or overlapping architecture set (e.g., different or "heterogeneous" IP instruction set). For instance, IPs having a first instruction set may be emulated on a host system (or "platform") that contains heterogeneous IPs (i.e., having a different instruction set than the first instruction set). In this way, application programs and/or an OS compiled for the instruction set of the emulated IPs may be run on the host system. Of course, the tasks performed for emulating the IPs (and enabling their execution of the application programs and/or OS running on the emulated IPs) are performed by the actual, underlying IPs of the host system.

As one example, assume a host system is implemented having a commodity-type OS (e.g., WINDOWS® or LINUX®) and a plurality of IPs having a first instruction set; and a legacy operating system (e.g., OS 2200) may be implemented on such host system, and IPs that are compatible with the legacy OS (and having an instruction set different from the first instruction set of the host system's IPs) may be emulated on the host system. In this way, the legacy OS and application programs compiled for the emulated IPs instruction set may be run on the host system (e.g., by running on the emulated IPs). Additionally, application programs and a commodity-type OS that are compiled for the first instruction may also be run on the system, by executing directly on the host system's IPs.

One exemplary area in which emulated IPs have been desired and employed is for enabling an OS and/or application programs that have conventionally been intended for execution on mainframe data processing systems to instead be executed on off-the-shelf commodity-type data processing systems. In the past, software application programs that require a large degree of data security and recoverability were traditionally supported by mainframe data processing systems. Such software application programs may include those associated with utility, transportation, finance, government, and military installations and infrastructures, as examples. Such application programs were generally supported by mainframe systems because mainframes generally provide a large degree of data redundancy, enhanced data recoverability features, and sophisticated data security features.

As smaller "off-the-shelf" commodity data processing systems, such as personal computers (PCs), increase in processing power, there has been some movement towards using those types of systems to support industries that historically employed mainframes for their data processing needs. For instance, one or more PCs may be interconnected to provide access to "legacy" data that was previously stored and maintained using a mainframe system. Going forward, the PCs may be used to update this legacy data, which may comprise records from any of the aforementioned sensitive types of applications.

For these and other reasons it has become popular to emulate a legacy OS (e.g., OS 2200 from UNISYS® Corp.) on a machine operating under the primary control of a commodity OS (e.g., LINUX®). In other words, IPs are emulated on a host system, and the legacy OS, as well as certain application programs, run on the emulated IPs. Exemplary emulated environments (e.g., with emulated IPs) are described further in: 1) U.S. Pat. No. 6,587,897 titled "Method for enhanced I/O in an emulated computing environment;" 2) U.S. Pat. No. 7,188,062 titled "Configuration management for an emulator operating system;" 3) U.S. Pat. No. 7,058,932 titled "System, computer program product, and methods for emulation of computer programs;" 4) U.S. Patent Application Publication Number 2010/0125554 titled "Memory recovery across reboots of an emulated operating system;" 5) U.S. Patent Application Publication Number 2008/0155224 titled "System and method for performing input/output operations on a data processing platform that supports multiple memory page sizes;" and 6) U.S. Patent Application Publication Number 2008/0155246 titled "System and method for synchronizing memory management functions of two disparate operating systems," the disclosures of which are hereby incorporated herein by reference. While the above-incorporated disclosures provide exemplary emulated systems and thus aid those of ordinary skill in the art in understanding exemplary implementations that may be employed for emulating IPs on a host system and deploying an OS (e.g., a legacy OS) and/or application programs running on such emulated IPs, embodiments of the present invention are not limited to the exemplary systems or emulation techniques disclosed therein.

SUMMARY

While dispatchers and dispatching techniques for assigning tasks based on affinity with processor(s), as discussed above, have been employed in systems where the OS controls the IPs directly (e.g., where the OS and application programs execute directly on the system's IPs), such affinity-based task assignment has not been employed in emulated environments, where the OS controls the emulated IPs but not the underlying IPs of the host system. For instance, in conventional legacy OS (e.g., OS 2200) CMOS systems, the OS controls the IPs directly. However, in previous emulated systems (e.g., where 2200 IPs are emulated on a host system and a legacy OS runs on the emulated IPs), the System Architecture Interface Level ("SAIL") (Linux) controlled what 2200 IP executed on what underlying host system's IPs (e.g., Intel core(s)). In such previous emulated systems, there was no binding of the emulated processing environment (e.g., emulated 2200 IPs) to the underlying actual IPs of the host system (e.g., the Intel cores), and thus management of the task assignments (e.g., through affinity-based task assignment) by the legacy OS running on the emulated IPs was not available.

Thus, this disclosure relates generally to the field of managing assignment of tasks among instruction processors (IPs) within a computer system having multiple IPs, and more particularly to binding emulated IPs with a host system's IPs (e.g., processor cores) for facilitating control over affinity-based assignment of tasks among the host system's IPs by a task manager, such as a dispatcher within an operating system (OS), that is executing on the emulated IPs. For instance, certain embodiments of the present invention provide techniques for binding emulated IPs with actual IPs of a computing system that is hosting the emulated IPs, thereby enabling better control of management of the system (e.g., control over affinity-based task assignment among the host system's IPs) by a task manager (e.g., a dispatcher in the legacy OS) executing on the emulated IPs. For instance, in certain embodiments, a dispatcher (e.g., of an OS running on emulated IPs) manages assignment of tasks performed for an application program (which is running on the emulated IPs) among IPs of a host system that is hosting the emulated IPs.

In one exemplary embodiment, a method is provided for task management in a multiprocessor computer system. The method comprises running a task manager on emulated IPs that are hosted on a host system having actual IPs. The task manager may be implemented, for example, in an OS running on the emulated IPs. The emulated IPs may have a different instruction set than the instruction set of the host system's actual IPs.

The method further comprises binding one or more of the host system's actual IPs to one or more of the emulated IPs, and performing affinity-based task management by the task manager for managing tasks assigned among the host system's actual IPs. The affinity-based task management may be performed by the task manager through the task manager directly managing assignment of tasks among the emulated IPs, wherein the binding facilitates indirect management of the assignment of tasks among the host system's actual IPs.

In certain embodiments, the method binding comprises receiving an affinity ID of each of the host system's actual IPs, and associating, by the task manager, the received affinity IDs for one or more of the host system's actual IPs with one or more emulated IPs.

In certain embodiments, the binding is performed at least for switching queue levels 1, 2, and 3; where switching queue level 1 means there is a switching queue per IP bus, level 2 means there is a switching queue per subpod, and level 3 means there is a switching queue per pod.

BRIEF DESCRIPTION OF THE DRAWINGS

For a more complete understanding of the present teachings, reference is now made to the following description taken in conjunction with the accompanying drawings.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein, such as the operations for managing (e.g., by a dispatcher) assignment of tasks performed for an application program executing on emulated IPs among IPs of a host system that is hosting the emulated IPs, are implemented as a sequence of computer implemented steps, operations, or procedures running on a programmable circuit within a computer.

Figure 1A:
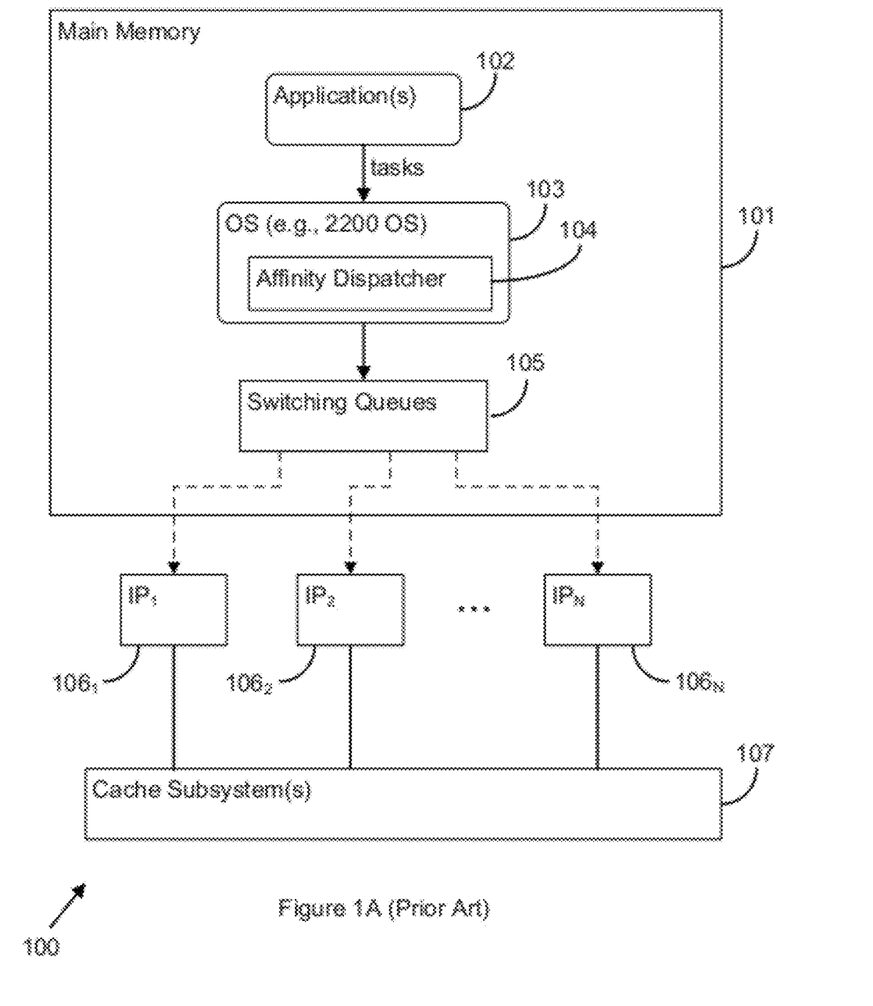
FIG. 1A is a block diagram illustrating an example of a conventional multiprocessor system having an operating system ("OS") running directly on the system's instruction processor(s) (IPs), where the OS includes an affinity dispatcher for assigning tasks based on affinity with ones of the system's IPs.

FIG. 1A shows a block diagram illustrating an example of a conventional multiprocessor system 100 having an operating system ("OS") 103 that includes an affinity dispatcher 104 for assigning tasks based on affinity with ones of instruction processor(s) (IPs) 106. System 100 includes a main memory 101, a plurality of instruction processors (IPs) $106_1$-$106_N$ (collectively "the IPs 106"), and cache subsystem(s) 107. OS 103 is, in this example, adapted to execute directly on the system's IPs 106, and thus has direct control over management of the task assignment among such IPs 106.

In one example, system 100 provides a "legacy platform" on which OS 103 executes, where such legacy platform is an enterprise-level platform, such as a mainframe, that typically provides the data protection and recovery mechanisms needed for application programs that are manipulating critical data and/or must have a long mean time between failures. Such systems also ensure that memory data is maintained in a coherent state. In one exemplary embodiment, the legacy OS 103 is the 2200 (CMOS) OS and an exemplary legacy platform is a 2200 mainframe data processing system, each commercially available from the UNISYS® Corporation. Alternatively, the legacy OS 103 may be some other type of OS, and the legacy platform may be some other enterprise-type environment.

Application programs (APs) 102 communicate directly with legacy OS 103. These APs may be of a type that is adapted to execute directly on a legacy platform. APs 102 may be, for example, those types of application programs that require enhanced data protection, security, and recoverability features generally only available on legacy mainframe platforms. Thus, OS 103 manages the assignment of tasks (processes) to be performed for execution of the APs 102 among the IPs 106 on which the OS 103 and APs 102 directly run.

To take advantage of cache subsystems 107 (which provides for quicker access to data because of cache's proximity to individual processors or groups of processors), OS 103 assigns tasks based on affinity with a particular one (or a particular group) of IPs 106 that has the most likely needed data already in local cache memory(ies) 107 to bring about efficiencies. In this example, OS 103 includes an affinity dispatcher 104, which uses switching queues 105 and associated algorithms for controlling the assignment of tasks to corresponding ones of the IPs 106. When an IP "wants" (is ready for) a new task, it will execute the (usually) re-entrant code that embodies the algorithm that examines the switching queue 105. It will determine the next task to do on the switching queue and do it.

Figure 1B:
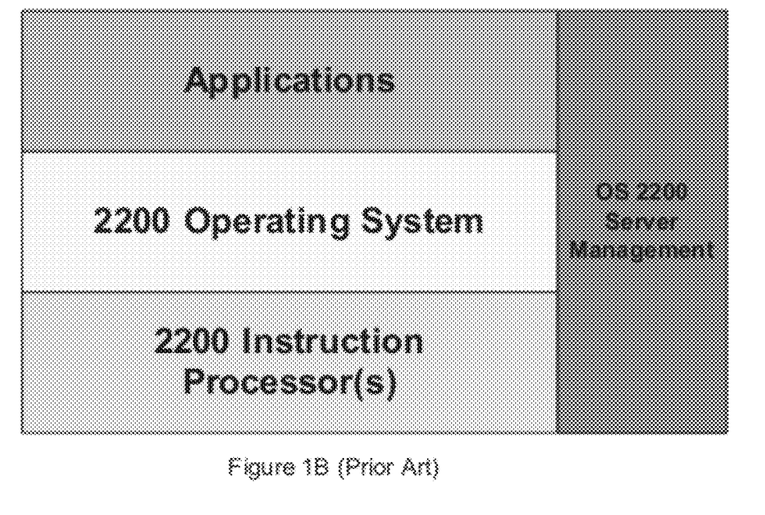
FIG. 1B is a high-level block diagram of the OS 2200 mainframe (CMOS) architecture, which is one example of an architecture that includes an OS with an affinity dispatcher for managing tasks assigned among a system's IPs on which the OS is directly executing.

Thus, as illustrated in FIG. 1A, dispatchers (e.g., dispatcher 104) and dispatching techniques for assigning tasks based on affinity with IPs 106 have been employed in systems where the OS 103 controls the IPs 106 directly (e.g., the application programs 102 execute directly on the system's IPs 106). As one example of an OS 103 that may be implemented in the manner described with FIG. 1A, the OS 2200 mainframe (CMOS) OS available from UNISYS® Corp. supports a mechanism called Affinity Dispatching. A high-level block diagram of the OS 2200 mainframe (CMOS) architecture is shown in FIG. 1B.

Affinity dispatching systems (e.g., dispatcher 104) have the ability to configure switching queues 105 that correspond to cache neighborhoods. A large application program 102 may benefit from executing exclusively in some local cache neighborhood. In the 2200 mainframe (CMOS) architecture, for example, setting an affinity parameter to a non-zero value will cause all runs with original runid equal to one of the dedicated_runidx parameters to execute in a specific local cache neighborhood and all other runs to execute in the remaining cache neighborhoods. This and other techniques for implementing affinity-based task assignments and switching queues for affinity-based task assignment by a task manager (e.g., dispatcher in an OS) that is executing directly on the system's IPs are well-known in the art.

Conventionally, cache neighborhoods are defined by the following level and mainframe hardware organization (although, embodiments of the present invention are not limited to such cache neighborhood definitions):

| Level | Max Number of IPs | Cache Neighborhood |
| --- | --- | --- |
| 0 | 1 | IP dedication |
| 1 | 2 | Bus dedication |
| 2 | 3 | Sub-pod dedication |
| 3 | 4 | Pod dedication |

One form of a multiprocessor computer system 200 on which exemplary system 100 of FIG. 1A may be implemented, as well as which may be adapted to take advantage of embodiments of the present invention (as described further herein) is described with reference to FIG. 2. Larger versions can be built in a modular manner using more groups of components similar to the ones shown, but for purposes of this discussion a 16-processor version suffices. In the system illustrated in FIG. 2, there is a central main memory 201 having a plurality of memory storage units $MSU_{0-3}$. These can be configured to form a long contiguous area of memory or organized into many different arrangements as is understood in this industry.

The MSUs are each connected to each of the two crossbars 202, 203, which in turn are connected to the highest level of cache in this exemplary system, the Third Level Caches (TLCs) 204-207. These TLCs are shared cache areas for all the Instruction Processors (IPs) underneath them. Data, instruction and other signals may traverse these connections similarly to a bus, but advantageously by direct connection through the crossbars in a well-known manner. The processors $IP_{0-15}$ may, in certain implementations, be IPs of the "2200" variety in a Cellular MultiProcessing (CMP) computer system from UNISYS Corporation, as in the legacy platform of FIG. 1A. In other implementations, such as in a host system (e.g., commodity system) on which 2200-type IPs are emulated, such as described further below with FIGS. 3-4, the processors $IP_{0-15}$ may be configured with a different instruction set than the instruction set of the IPs being emulated. As an example, IPs of the 2200 variety may be emulated on the host system and a legacy OS (e.g., OS 2200) may be running on such emulated IPs, while the IPs of the underlying host system (the "hardware platform" or "commodity platform") may have, for instance, an INTEL® processor core, such as the Nehalem INTEL processor microarchitecture for example.

Figure 2:
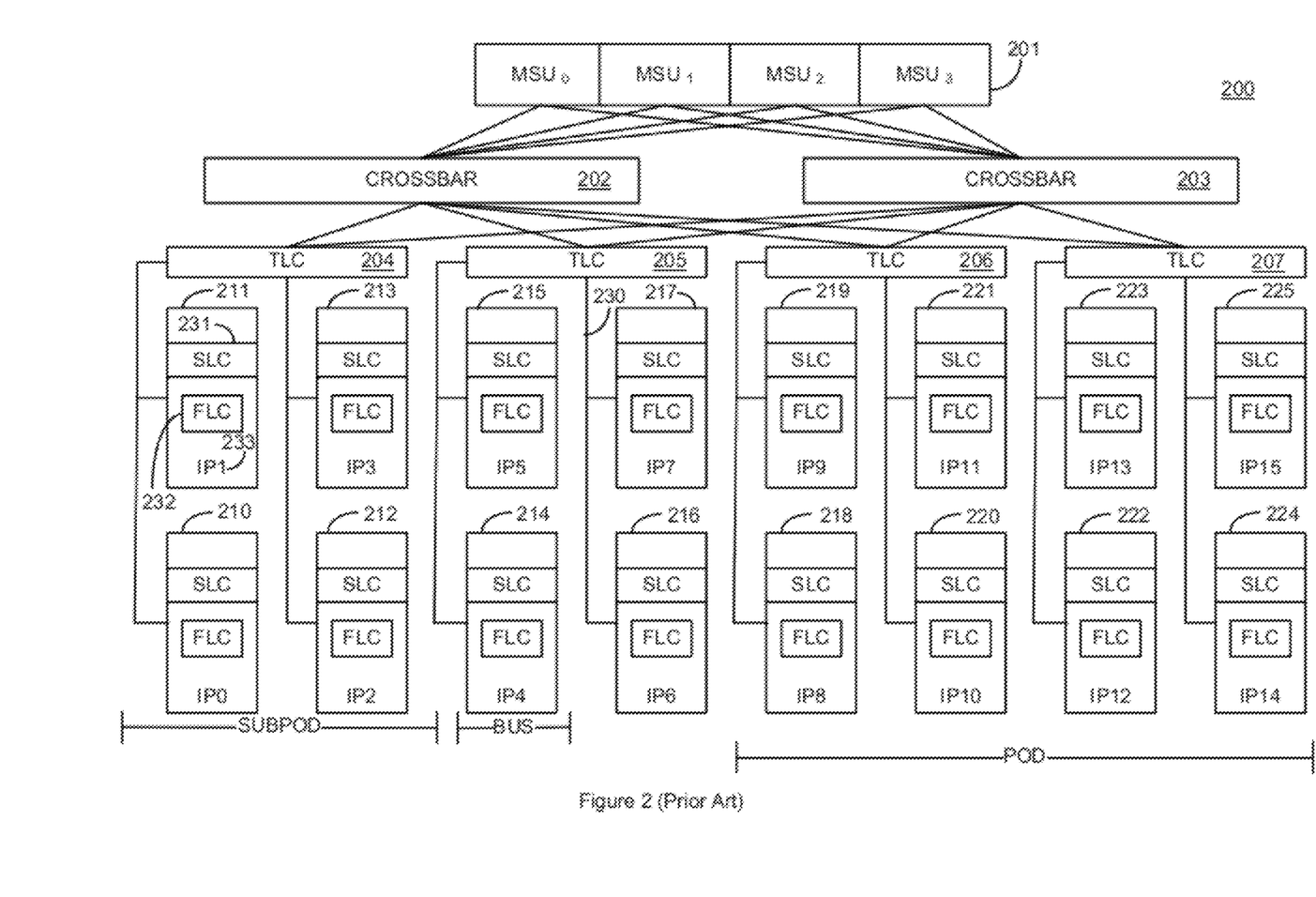
FIG. 2 is a block diagram illustrating one form of a multiprocessor computer system on which the exemplary system of FIG. 1A may be implemented, as well as which may be adapted to take advantage of embodiments of the present invention.

In the example of FIG. 2, a store-through cache is closest to each IP, and since it is the first level cache above the IP, it is called for a First Level Cache (FLC). The second level caches and third level caches are store-in caches in the illustrated example of FIG. 2. The Second Level Caches (SLCs) are next above the FLCs, and each IP has its own SLC as well as a FLC in the exemplary implementation of FIG. 2.

Note that the blocks 210-225, each containing a FLC, SLC and IP, are connected via a bus to their TLC in pairs and that two such pairs are connected to each TLC. Thus, the proximity of the SLCs of $IP_0$ and $IP_1$ is closer than the proximity of $IP_2$ and $IP_3$ to the SLCs of $IP_0$ and $IP_1$. (The buses are illustrated in FIG. 2 as single connecting lines; example: TLC 205 connected by bus 230 to blocks 217 and 216). Each of these buses is an example of the smallest and usually most efficient multiprocessor cache neighborhood in this exemplary implementation. Two threads that share data will execute most efficiently when confined to one of these cache neighborhoods.

Also, the proximity of $IP_{0-3}$ to TLC 204 is greater than the proximity of any of the other IP's to TLC 204. By this proximity, a likelihood of cache hits for processes or tasks being handled by most proximate IPs is enhanced. Thus, if $IP_1$ has been doing a task, the data drawn into SLC 231 and TLC 204 from main memory (the MSUs 201) is more likely to contain information needed for that task than are any of the less proximate caches (TLCs 205, 206, 207 and their SLCs and FLCs) in the system 200. Tasks that require 3 or 4 processors will execute most efficiently in a TLC cache neighborhood, called a SubPod.

Note that we may use the following terminology to refer to various neighborhoods by size. A Pod, in the exemplary system shown in FIG. 2, refers to the caches under a crossbar 202, 203, thus consisting of two TLCs and the lower level caches underneath them in the illustrated example. A SubPod, in the exemplary system shown in FIG. 2, refers to those cache memory areas subsidiary to and including a TLC. In FIG. 2 a TLC 204 has the SubPod indication shown. A Bus neighborhood, in the exemplary system of FIG. 2, refers to the cache memories of two IPs, illustrated in FIG. 2 as including the caches of IPs 4 and 5. The Pod attached to crossbar 203 is indicated to include TLCs 206 and 207 in the illustrated example of FIG. 2.

It should be noted that this system 200 describes a 16 IP system, and that with two additional crossbars, the system could be expanded in a modular fashion to a 32 IP system, and that such systems can be seen for example in the UNISYS Corporation CMP CS7802 computer system, and could also be applied to the UNISYS ES7000 computer system with appropriate changes to its OS, in keeping with the principles taught herein. It should also be recognized that neither number of processors, nor size, nor system organization is a limitation upon the teachings of this disclosure. For example, any multiprocessor computer system, whether NUMA (Non-Uniform Memory Architecture) architected or UMA (Uniform Memory Architecture) as in the detailed example described with respect to FIG. 2 could employ the teachings herein.

Figure 3A:
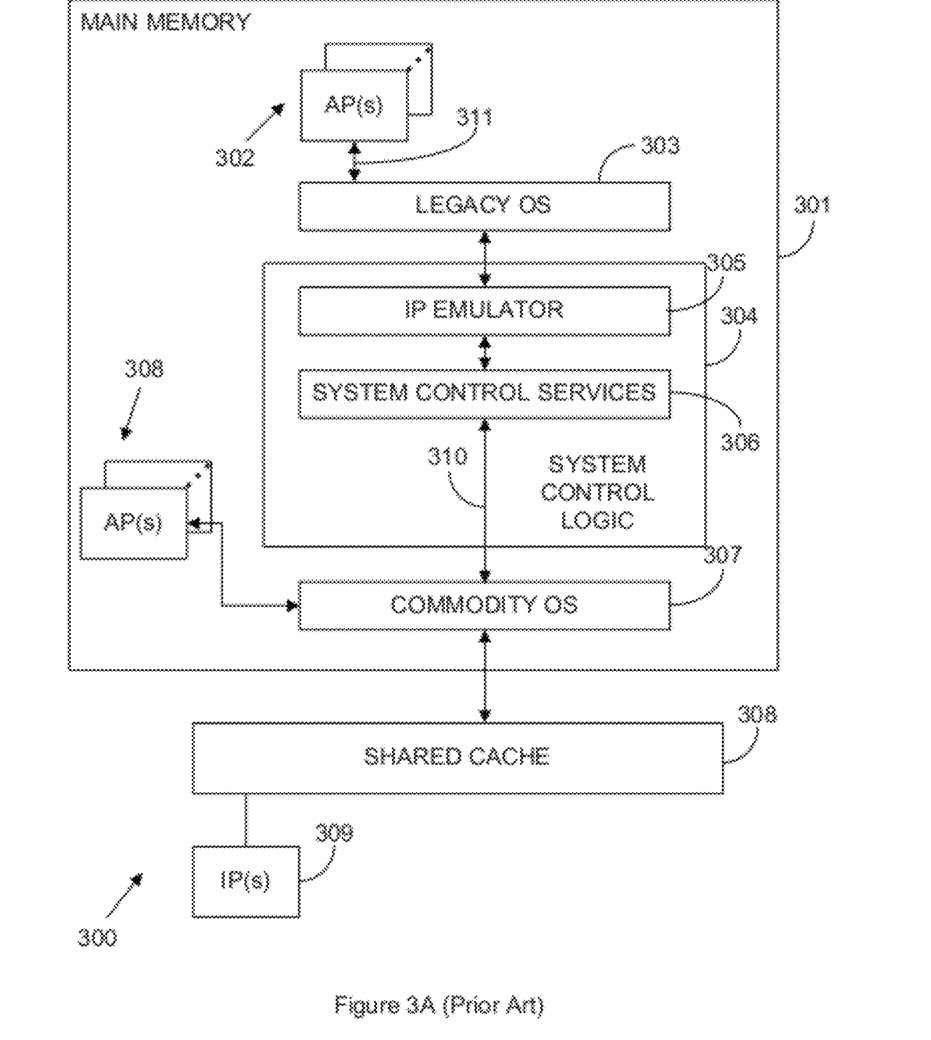
FIG. 3A is a block diagram of an exemplary conventional data processing system that employs emulated IPs on a host system with an OS running on the emulated IPs.

FIG. 3A is a block diagram of one exemplary embodiment of a conventional data processing system 300 that employs emulated IPs 305 on a host system with a legacy OS 303 running on the emulated IPs 305. The host system may, for example, be a commodity-type data processing system such as a personal computer, workstation, or other "off-the-shelf" hardware (hereinafter "commodity platform"). This system includes a main memory 301, which may optionally be coupled to a shared cache 308 or some other type of bridge circuit. The cache system 308 may be implemented, for example, in the manner described above with FIG. 2. The shared cache 308 is, in turn, coupled to one or more IPs 309 of the host system. In one embodiment, the IPs 309 include commodity-type IPs such as are available from Intel Corporation, Advanced Micro Devices Incorporated, or some other vendor that provides IPs for use in commodity platforms. The host system's IPs 309 may have a different instruction set as compared to the instruction set of the emulated IPs 305.

A commodity OS 307, such as UNIX®, LINUX®, WINDOWS®, or any other operating system adapted to operate directly on the host system's IPs 309, resides within main memory 301 of the illustrated system. The commodity OS 307 is natively responsible for the management and coordination of activities and the sharing of the resources of the host data processing system, such as task assignment among the host system's IPs 309.

According to the illustrated system, legacy OS 303 of the type that is generally associated with mainframe systems is loaded into main memory 301. This legacy OS may be the OS 2200 mainframe (CMOS) operating system commercially available from UNISYS® Corporation, or some other similar OS. This type of OS is adapted to execute directly on a "legacy platform," which is an enterprise-level platform such as a mainframe that typically provides the data protection and recovery mechanisms needed for application programs (e.g., APs 302) that are manipulating critical data and/or must have a long mean time between failures. Such systems may also ensure that memory data is maintained in a coherent state. In one exemplary embodiment, an exemplary legacy platform may be a 2200 data processing system commercially available from the UNISYS® Corporation, as mentioned above. Alternatively, this legacy platform may be some other enterprise-type environment.

In one adaptation, legacy OS 303 may be implemented using a different machine instruction set (hereinafter, "legacy instruction set," or "legacy instructions") than that which is native to the host system's IP(s) 309. This legacy instruction set is the instruction set which is executed by the IPs of a legacy platform on which legacy OS 303 was designed to operate. In this embodiment, the legacy instruction set is emulated by IP emulator 305, and thus OS 303 and APs 302 run on the emulated IPs 305, rather than running directly on the host system's actual IPs 309.

IP emulator 305 may include any one or more of the types of emulators that are known in the art. For instance, the emulator may include an interpretive emulation system that employs an interpreter to decode each legacy computer instruction, or groups of legacy instructions. After one or more instructions are decoded in this manner, a call is made to one or more routines that are written in "native mode" instructions that are included in the instruction set of the host system's IP(s) 309. Such routines generally emulate operations that would have been performed by the legacy system. As discussed above, this may also enable APs 302 that are compiled for execution by an IP instruction set that is different than the instruction set of the host system's IPs 309 to be run on the system 300 (e.g., by running on the emulated IPs 305).

Another emulation approach utilizes a compiler to analyze the object code of legacy OS 303 and thereby convert this code from the legacy instructions into a set of native mode instructions that execute directly on the host system's IP(s) 309. After this conversion is completed, the legacy OS 303 then executes directly on IP(s) 309 without any run-time aid of emulator 305. Another emulation approach known as binary static or dynamic translation passes legacy binary code through a translator to create an intermediate language for compiling and executing on a native system. For example, the legacy OS 303 may execute directly on the IP(s) 309 in binary static or dynamic translation emulation mode. These, and/or other types of emulation techniques may be used by IP emulator 305 to emulate legacy OS 303 in an embodiment wherein OS 303 is written using an instruction set other than that which is native to the host system's IP(s) 309.

IP emulator 305 is, in the illustrated example, coupled to System Control Services (SCS) 306. Taken together, IP emulator 305 and SCS 306 comprise system control logic 304, which provides the interface between APs 302 and legacy OS 303 and commodity OS 307 in the illustrated exemplary system of FIG. 3A. For instance, when legacy OS 303 makes a call for memory allocation, that call is made via IP emulator 305 to SCS 306. SCS 306 translates the request into the format required by API 310. Commodity OS 307 receives the request and allocates the memory. An address to the memory is returned to SCS 306, which then forwards the address, and in some cases, status, back to legacy OS 303 via IP emulator 305. In one embodiment, the returned address is a C pointer (a pointer in the C programming language) that points to a buffer in virtual address space.

SCS 306 also operates in conjunction with commodity OS 307 to release previously-allocated memory. This allows the memory to be re-allocated for another purpose.

Application programs (APs) 302 communicate and are dispatched by legacy OS 303. These APs 302 may be of a type that is adapted to execute directly on a legacy IP emulator. APs 302 may be, for example, those types of applications that require enhanced data protection, security, and recoverability features generally only available on legacy platforms. The exemplary configuration of FIG. 3A allows these types of APs 302 to be migrated to a commodity platform through use of the emulated processing environment.

Legacy OS 303 receives requests from APs 302 for memory allocation and for other services via interface(s) 311. Legacy OS 303 responds to memory allocation requests in the manner described above, working in conjunction with IP emulator 305, SCS 306, and commodity OS 307 to fulfill the request.

The system of FIG. 3A may further support APs 308 that interface directly with commodity OS 307. In this manner, the data processing platform supports execution of APs 302 that are adapted for execution on enterprise-type legacy platforms, as well as APs 208 that are adapted for a commodity environment such as a PC.

Thus, as illustrated in FIG. 3A, an emulated processing environment (e.g., legacy OS and/or application programs running on emulated IPs) may be implemented on a host system. However, in such emulated environment, the legacy OS 303 running on the emulated IPs 305 does not have direct control of the host system's IPs 309 in the manner that the OS 103 of FIG. 1A has over the IPs 106. Accordingly, management of task assignment among the host system's IPs 309 is largely out of the control of legacy such OS 303 running on the emulated IPs 305. For instance, affinity-based task assignment of the type performed by dispatcher 104 in the example of FIG. 1A has not been employed when the OS (e.g., OS 303 of FIG. 3A) is executing in an emulated processing environment, where the OS 303 controls the emulated IPs 305 but not the underlying IPs 309 of the host system.

Figure 3B:
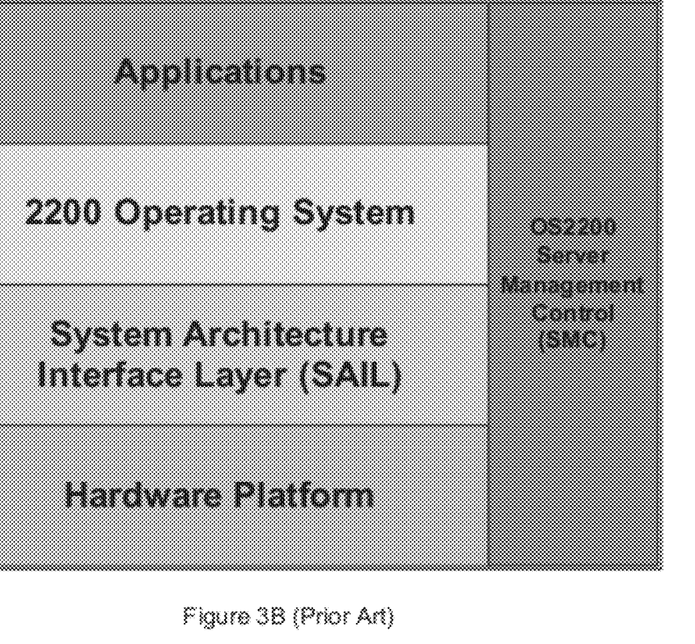
FIG. 3B is a high-level block diagram of an Emulated OS 2200 mainframe architecture, which is one example of an architecture that may be employed for implementing the emulated environment on the host system of FIG. 3A.

As one example of an OS 303 that may be implemented in an emulated processing environment in the manner described with FIG. 3A, the Emulated OS 2200 mainframe operating system available from UNISYS® Corp. may be so implemented. A high-level block diagram of an Emulated OS 2200 mainframe architecture is shown in FIG. 3B. In FIG. 3B, the System Architecture Interface Layer (SAIL) is the software package between the OS 2200 and the commodity (e.g., INTEL) hardware platform. The SAIL software package includes the following components:

SAIL Kernel—SUSE Linux Enterprise Server (SLES11) distribution with open source modifications;
System Control (SysCon)—The glue that creates and controls the instruction processor emulators;
SAIL Control Center—User interface to SAIL;
2200 Instruction Processor emulator—based on 2200 ASA-00108 architecture;
Network emulators; and
Standard Channel Input/Output processor (TOP) drivers.

The hardware platform is, in one exemplary implementation, an RD910 DELL® server with associated storage input/output processors, host bus adapters, host adapters, and network interface cards. This exemplary hardware platform supports 4 INTEL Nehalem HPC sockets. Each socket has:
6 core 2.67 GHz;
32 kbyte L1 Instruction cache, 16 kbyte L1 data cache (local to a core);
256 kbyte L2 cache (local to core); and
8 Mbytes L3 cache (local to socket).

While the above-mentioned RD910 hardware platform is used as concrete example herein for describing one illustrative implementation, embodiments of the present invention are not limited to any particular host system or hardware platform but may instead be adapted for application with any underlying host system.

As discussed above, in conventional legacy OS (e.g., OS 2200) CMOS systems, such as that illustrated in FIGS. 1A-1B, the OS controls the IPs directly. However, in conventional emulated systems (e.g., where 2200 IPs are emulated on a host system), such as in the example of FIGS. 3A-3B, the System Architecture Interface Level ("SAIL") (Linux) controls what 2200 IP executed on what underlying host system's IPs (e.g., Intel core(s)). In such conventional emulated systems, there was no binding of the emulated processing environment (e.g., emulated IPs 305) to the underlying IPs 309 of the host system (e.g., the Intel cores), and thus management of the task assignments (e.g., through affinity-based task assignment) was not controlled by the legacy OS 303 executing on the emulated IPs 305.

Embodiments of the present invention provide a new binding technique that may be employed for binding a host system's IPs 309 to emulated OS IPs 305. Accordingly, through such binding the emulated OS 303 may use affinity-based dispatching algorithms for assigning tasks to the host system's IPs 309 in an intelligent manner that facilitates improved processing efficiency.

Figure 4:
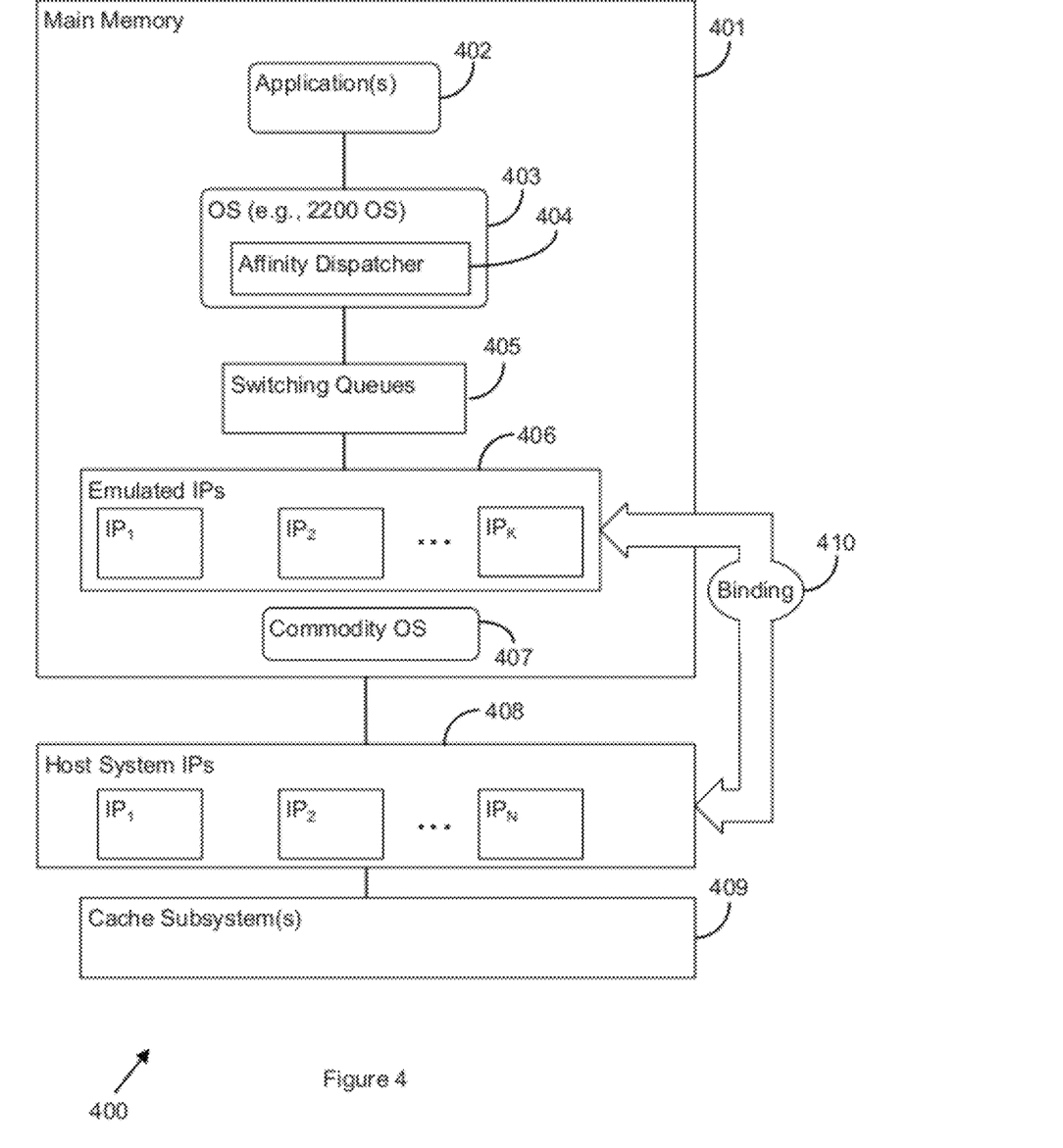
FIG. 4 shows a block diagram of an exemplary system according to one embodiment of the present invention.

FIG. 4 shows a block diagram of an exemplary system 400 according to one embodiment of the present invention. In the illustrated example, an OS 403 (e.g., a legacy OS) is executing on emulated IPs 406 for supporting execution of application programs 402, similar to the legacy OS 303 executing on emulated IPs 305 for supporting execution of application programs 302 in the exemplary system of FIG. 3A discussed above. Additionally, as with the commodity OS 307 discussed above with FIG. 3A, the host system of FIG. 4 may also include a native host (e.g., "commodity") OS 407 that runs directly on the host system's IPs 408. Further, as with the cache 308 and host system IPs 309 in the exemplary system of FIG. 3A, the system 400 of FIG. 4 also includes host system IPs 408 and a cache subsystem 409. The cache subsystem 409 may be implemented, for example, in the manner described above with FIG. 2 or in any other desired manner for implementing cache subsystems for IPs.

In the exemplary embodiment of FIG. 4 a binding 410 is provided in accordance with exemplary techniques described further herein for binding the host system's IPs 408 to emulated IPs 406. For example, the binding 410 may be created by calling sched_setscheduler1, which is a modified version of the Linux standard call sched_setscheduler with an affinity parameter added. Accordingly, through such binding 410 a task manager (e.g., the OS 403) running on emulated IPs 406 may use affinity-based dispatching algorithms for effectively controlling task assignments among the host system's IPs 408 in an intelligent manner that facilitates improved processing efficiency (e.g., to facilitate reuse of cached data residing in the cache subsystem 409 of a given one or group of host system IPs 408).

For instance, in the example of FIG. 4, OS 403 includes an affinity dispatcher 404 for assigning tasks based on affinity with processor(s), in a manner similar to the affinity dispatcher 104 described above with FIG. 1. To take advantage of cache subsystems 409 (which provides for quicker access to data because of cache's proximity to individual processors or groups of processors 408), OS 403 may assign tasks based on affinity with a particular one (or a particular group) of IPs 408 that has the most likely needed data already in local cache memory(ies) 409 to bring about efficiencies.

In this example, OS 403 includes an affinity dispatcher 404, which uses switching queues 405 and associated algorithms for controlling the assignment of tasks to corresponding ones of the emulated IPs 406. Of course, any affinity-based task management scheme/implementation may be employed in accordance with the concepts described herein, and thus embodiments of the present invention are not limited to any specific affinity dispatcher implementation. Because the host IPs 408 may be bound (through binding 410) to the emulated IPs 406, the OS 403 executing on the emulated IPs 406 is able to effectively manage the assignment of tasks among the host system IPs 408 (e.g., by managing the assignment of tasks among the emulated IPs 406, which are bound to ones of the host system's IPs 408).

Binding 410 may be achieved in any suitable manner for associating one or more of emulated IPs 406 with a corresponding one or more of actual host system IPs 408. Exemplary techniques that may be employed for achieving the binding 410 are described further herein. Of course, the techniques described further herein that may be so employed within a system for binding OS 2200-type of emulated IPs with Intel Nehalem IP cores may be adapted for similar implementation within other system architectures. Thus, embodiments of the present invention are not limited to any specific binding technique or to any specific system architecture, but rather one of ordinary skill in the art will appreciate that the general concept for binding emulated IPs with actual host system IPs may be implemented in any of numerous ways, depending upon a given system's architecture, consistent with the teachings herein.

As shown in FIG. 4, "N" number of host system IPs 408 may be implemented on host system, where N is two or more IP cores. Also, "K" number of IPs 406 may be emulated. K may equal N in certain embodiments, and K may be different (e.g., more or less) than N in other embodiments. Further, the binding 410 need not be a one-for-one binding between emulated IPs 406 and host system IPs 408. For instance, a plurality of emulated IPs 406 may be bound to a single host system IP 408 and/or vice versa in certain embodiments. Additionally, as will be appreciated from the further description below of an exemplary implementation of one embodiment, the binding 410 need not be a permanent binding, but instead the binding 410 may dynamically vary. That is, ones of host system IPs 408 that are bound to corresponding ones of emulated IPs 406 may dynamically change over time, such as over the course of application programs 402 being initiated, terminated, interrupted, etc.

While a specific, concrete exemplary host system and emulated IPs on which an exemplary OS is running are described further herein for illustrative purposes, embodiments of the present invention are not limited to any particular OS that is executing for an emulated environment, nor are embodiments of the present invention limited to any particular IP instruction set for IPs that are being emulated. Further, embodiments of the present invention are likewise not limited to any particular OS that may natively reside on a host system, nor are embodiments of the present invention limited to any particular IP instruction set for underlying IPs of a host system that is hosting the emulated IPs.

While many illustrative examples are provided herein wherein a legacy OS is running on emulated IPs that are hosted on a commodity-type host platform, embodiments of the present invention are not limited to such implementations. As those of ordinary skill in the art will readily appreciate, the concepts disclosed herein may be employed when any type of OS is running on any type of emulated IPs that are being hosted on any type of host platform.

Exemplary Implementation.

As an illustrative exemplary implementation of one embodiment of the present invention, the following description proposes an implementation in which an OS 2200 mainframe operating system is executing on emulated 2200 variety of IPs on a RD910 DELL server host system (or "hardware platform"). As mentioned above, the RD910 DELL server with associated storage input/output processors, host bus adapters, host adapters, and network interface cards. This exemplary hardware platform supports 4 INTEL Nehalem HPC sockets. Each socket has:

6 core 2.67 GHz;
32 kbyte L1 Instruction cache, 16 kbyte L1 data cache (local to a core);
256 kbyte L2 cache (local to core); and
8 Mbytes L3 cache (local to socket).

In accordance with an embodiment of the present invention, the OS 2200 mainframe (emulated) operating system is able to use the existing affinity dispatching algorithms and a new binding technique to bind INTEL cores of the host system to the emulated OS 2200 IPs. This gives the OS 2200 operating system more control of the system. In this exemplary implementation, the OS 2200 emulated IPs are tied directly to one or more of the INTEL cores of the host system, which provides the OS 2200 better control of the mainframe environment and makes the system look and feel more like the OS 2200 CMOS systems.

OS 2200 Operating System Dispatcher Affinity in the Exemplary Implementation.

Exec affinity is enabled if the Partition Data Bank (PDB) cell Scheduling Affinity Support has the value AFF. If Exec affinity is enabled, then the Exec configuration tag switching_queue_affinity_level controls the "level" of affinity. A value of 0 means that there is a switching queue per IP; a value of 1 means there is a switching queue per IP bus (or equivalent); a value of 2 means there is a switching queue per subpod (or equivalent); a value of 3 means there is a switching queue per pod (or equivalent); and a value of 4 means there is one switching queue for the entire system (equivalent to affinity being disabled).

Commodity Platform Architecture in the Exemplary Implementation.

Nehalem sockets have the memory controller on chip. This means that there are as many memory controllers in the system as there are sockets. Each socket has 3 memory channels. A socket's access to the memory attached to it (its memory controller) has higher bandwidth and lower latency than a socket's access to the memory attached to other sockets. This is the NUMA affect.

Additionally, the Nehalem socket has a dedicated L1 cache per core, a dedicate L2 cache per core, and a shared L3 cache per socket. On the EX socket, the socket that will be used on the DELL R910, the cache sizes are:

L1 cache: 32 Kbytes instruction; 16 Kbytes data;
L2 cache: 256 Kbytes; and
L3 cache: 8 Mbytes.

It should be noted that the L1 data cache is half the size of what is on the Nehalem EP sockets as well as the Tigerton socket used on the Dell R900. The L2 cache on the Tigerton socket is 4 Mbytes. The Tigerton socket does not have an L3 cache. The sharing of caches is also done differently on the Tigerton socket.

Some relevant Mariner 2.5 system characteristics on the DELL R910 are:

A) 2 Socket and 4 socket configurations will be supported.
B) Each socket is 6 core (core 0, 1, 2, 3, 4 and 5), 2.67 GHz.
C) The system memory is divided up evenly across sockets. Hence, each socket has local memory and all other memory requests require access through the socket with the relevant memory.

The exemplary implementation supports up to 16 emulator threads on a four socket system, and the following "rules" apply:

A) Emulator threads are balanced across the Intel sockets so that:
  1) Emulator and OS 2200 memory references are most evenly distributed across the memory subsystem.
  2) OS 2200 I/O is balanced across the two I/O controllers of the system.
B) Core 0 of Socket 0 is not used for an emulator thread as this core has a "special" role in the Intel system. It is the initial boot socket, the socket that subsequent sockets "boot from," that is the common source for TSC synchronization on the system.
C) SAIL and the OS 2200 operating system tend to over utilize the lower numbered CPUs. Thus, the SAIL and OS 2200 CPUs should preferably be bound on opposite ends of the CPU number range.

OS 2200 Operating System on Commodity Platform in the Exemplary Implementation.

When the value of switching_queue_affinity_level is 0 or 4, supporting Exec Affinity on Mariner requires no special consideration of how logical IPs are bound to physical CPUs. It gets somewhat more complicated when one considers setting the value of switching_queue_affinity_level to 1, 2, or 3. Those values "affinitize" IPs that has some level of cache sharing; and the concept does not translate directly onto the underlying Nehalem architecture of the host system in this exemplary implementation.

The most reasonable interpretation is that for those values of switching_queue_affinity_level, the Exec should "affinitize" all IPs that are on cores on the same socket. In order for this to work, there needs to be more control over which emulated IPs are bound to which physical CPUs. We need just enough control to guarantee that all IPs in the same affinity group are bound to CPUs on the same socket.

The table numbers 3 and 4 provided herein below define the Mariner2.5 affinity values within the PDB. Also described below is an exemplary method for passing the Intel Affinity Identifier, associated with a 2200 instruction processor, from the IP PDB handler data to the SAIL scheduling mechanism in accordance with this exemplary implementation.

SysCon—Emulator Binding in the Exemplary Implementation.

Figure 5:
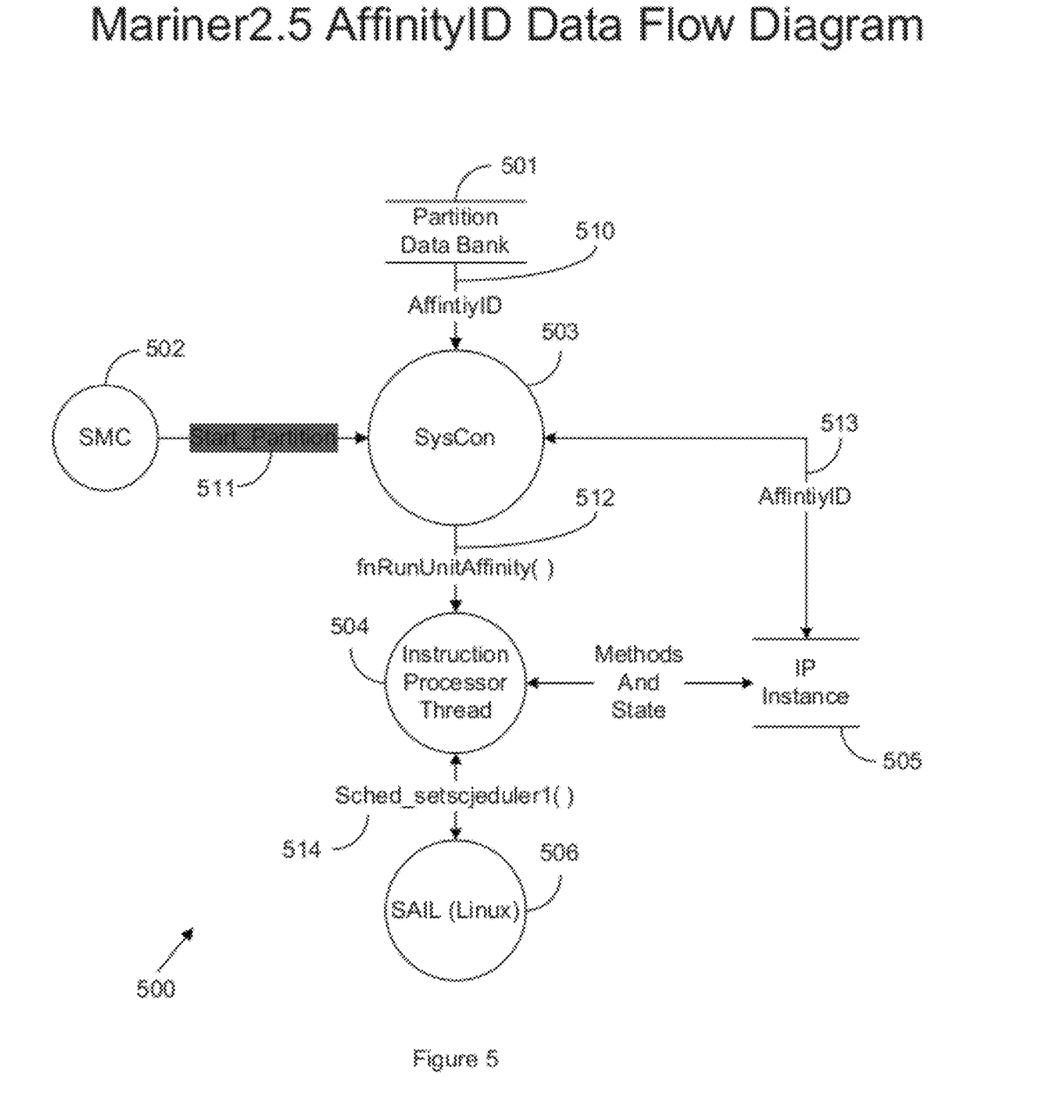
FIG. 5 is a flow diagram that shows how the Intel Affinity identifier is passed to the instruction processor in accordance with one exemplary implementation of an embodiment of the present invention.

The table numbers 3 and 4 provided below define the Intel Affinity Identifier for each 2200 emulated instruction processor. The Intel Affinity identifier is passed to the instruction processor by the following steps, with reference to the flow diagram of FIG. 5:

1) SysCon 503 retrieves, in operation 510, the Intel Affinity ID for each IP from the PDB IP handler data 501, using the IP UPI number, during initialization of the OS 2200 environment. The retrieved Intel Affinity ID of each IP is stored in the respective IP objects in operation 513.

2) When SMC 502 sends, in operation 511, START_PARTITION command, SysCon 503 initializes the OS 2200 environment and starts the 2200 instruction emulator thread 504, by calling the new fnRunUnitAffinity (in operation 512), and specifying the IP UPI number and the Affinity ID (in operation 513). If the fnRunUnitAffinity interface is not available the standard Linux fnRunUnit function is called without specifying the Affinity ID.

3) The 2200 instruction emulator thread 504 (called by fnRunUnitAffinity) passes the Affinity ID to SAIL 506 by calling the sched_setscheduler1 API (in operation 514). If the Affinity ID is zero or if the call fails the sched_setscheduler API is used.

SAIL—Emulator Binding (sched_setscheduler1) in the Exemplary Implementation.

The sched_setscheduler1 API (syscall 301), in operation 514 of FIG. 5, creates a super-FIFO IP thread based on an Intel Affinity Group ID. The sched_setscheduler1 API is similar to sched_setscheduler except for the additional Affinity Group ID parameter.

Affinity Handler Data in the Exemplary Implementation.

The format of the IP handler data in this exemplary implementation is provided in the following table number 2. See the following tables for the relationships between the Intel affinity Identifiers and the emulated OS 2200 instruction processors.

TABLE 2

UPI number of IP (unsigned integer word)
UPI number
Number of Affinity Levels (unsigned integer word)
4
Level 1 IP Affinity Group ID (unsigned integer word)
1-4
Level 2 IP Affinity Group ID (unsigned integer word)
1-4
Level 3 IP Affinity Group ID (unsigned integer word)
1-4
Level 4 IP Affinity Group ID - System instance (unsigned integer word)
1
Intel Affinity Group ID
1-4

TABLE 3

Two Socket System

| Socket | Core | 2200 Name | UPI Number | Affinity Groups |
|---|---|---|---|---|
| 1 | 5 | IP0 | 000 | 1, 1, 1, 1, 1 |
| 1 | 4 | IP1 | 001 | 1, 1, 1, 1, 1 |
| 1 | 3 | IP2 | 002 | 1, 1, 1, 1, 1 |
| 1 | 2 | IP3 | 003 | 1, 1, 1, 1, 1 |
| 1 | 1 | n/a | | |
| 1 | 0 | n/a | | |
| 0 | 5 | IP4 | 004 | 2, 2, 2, 1, 2 |
| 0 | 4 | IP5 | 005 | 2, 2, 2, 1, 2 |
| 0 | 3 | IP6 | 006 | 2, 2, 2, 1, 2 |
| 0 | 2 | IP7 | 007 | 2, 2, 2, 1, 2 |
| 0 | 1 | n/a | | |
| 0 | 0 | n/a | | |

TABLE 1

| Parameters | pid_t | Process ID (PID). If a process specified by PID exists, the scheduling policy and parameters will be set for that process. If PID is zero, the scheduling policy and scheduling parameters will be set for the calling process. |
| | int | Policy. The value for policy must be SCHED_SFIFO (6). |
| | Const struct sched_param * | The value of sched_priority in the sched_param structure can be any integer within the inclusive priority range 1 thru 99. |
| | int | Intel Affinity Group ID (AffinityID). SAIL will bind the thread specified by PID to a physical processor based on the AffinityID. The current AffinityID values are defined in other tables provided herein. (New) |
| Return | long | 0    Successful |
| | | −1   errno values: |
| | |    EINVAL    The value of policy is not SCHED_SFIFO (6) The value of AffinityID is undefined. There are no remaining physical processors that map to AffinityID. |
| | |    EPERM    The requesting process does not have permission to set either or both the scheduling parameter or the scheduling policy of the specified process. |
| | |    ESRCH    No process can be found corresponding to the process specified by PID. |
| | |    ENOSYS    syscall 301 has not been implemented by SAIL. Use sched_setscheduler instead. |

TABLE 4

Four Socket System

| Socket | Core | 2200 Name | UPI Number | Affinity Groups |
|---|---|---|---|---|
| 3 | 5 | IP0 | 000 | 1, 1, 1, 1, 1 |
| 3 | 4 | IP1 | 001 | 1, 1, 1, 1, 1 |
| 3 | 3 | IP2 | 002 | 1, 1, 1, 1, 1 |
| 3 | 2 | IP3 | 003 | 1, 1, 1, 1, 1 |
| 3 | 1 | n/a | | |
| 3 | 0 | n/a | | |
| 2 | 5 | IP4 | 004 | 2, 2, 2, 1, 2 |
| 2 | 4 | IP5 | 005 | 2, 2, 2, 1, 2 |
| 2 | 3 | IP6 | 006 | 2, 2, 2, 1, 2 |
| 2 | 2 | IP7 | 007 | 2, 2, 2, 1, 2 |
| 2 | 1 | n/a | | |
| 2 | 0 | n/a | | |
| 1 | 5 | IP8 | 010 | 3, 3, 3, 1, 3 |
| 1 | 4 | IP9 | 011 | 3, 3, 3, 1, 3 |
| 1 | 3 | IP10 | 012 | 3, 3, 3, 1, 3 |
| 1 | 2 | IP11 | 013 | 3, 3, 3, 1, 3 |
| 1 | 1 | n/a | | |
| 1 | 0 | n/a | | |
| 0 | 5 | IP12 | 014 | 4, 4, 4, 1, 4 |
| 0 | 4 | IP13 | 015 | 4, 4, 4, 1, 4 |
| 0 | 3 | IP14 | 016 | 4, 4, 4, 1, 4 |
| 0 | 2 | IP15 | 017 | 4, 4, 4, 1, 4 |
| 0 | 1 | n/a | | |
| 0 | 0 | n/a | | |

In view of the above, embodiments of the present invention provide techniques for binding ones of a host system's IPs with corresponding ones of emulated IPs. Such binding enables affinity-based task management of the host system's IPs to be performed by a task manager (e.g., a dispatcher of an OS) that is executing on the emulated IPs, rather than having direct control of the host system's IPs.

It is recognized that the above systems and methods operate using computer hardware and software in any of a variety of configurations. Such configurations can include computing devices, which generally include a processing device, one or more computer readable media, and a communication device. Other embodiments of a computing device are possible as well. For example, a computing device can include a user interface, an operating system, and one or more software applications. Several exemplary computing devices include a personal computer (PC), a laptop computer, or a personal digital assistant (PDA). A computing device can also include one or more servers, one or more mass storage databases, and/or other resources.

A processing device is a device that processes a set of instructions. Several examples of a processing device include a microprocessor, a central processing unit, a microcontroller, a field programmable gate array, and others. Further, processing devices may be of any general variety such as reduced instruction set computing devices, complex instruction set computing devices, or specially designed processing devices such as an application-specific integrated circuit device.

Computer-readable media includes volatile memory and non-volatile memory and can be implemented in any method or technology for the storage of information such as computer-readable instructions, data structures, program modules, or other data. In certain embodiments, computer-readable media is integrated as part of the processing device. In other embodiments, computer-readable media is separate from or in addition to that of the processing device. Further, in general, computer-readable media can be removable or non-removable. Several examples of computer-readable media include, RAM, ROM, EEPROM and other flash memory technologies, CD-ROM, digital versatile disks (DVD) or other optical storage devices, magnetic cassettes, magnetic tape, magnetic disk storage or other magnetic storage devices, or any other medium that can be used to store desired information and that can be accessed by a computing device. In other embodiments, computer-readable media can be configured as a mass storage database that can be used to store a structured collection of data accessible by a computing device.

A communications device establishes a data connection that allows a computing device to communicate with one or more other computing devices via any number of standard or specialized communication interfaces such as, for example, a universal serial bus (USB), 802.11a/b/g network, radio frequency, infrared, serial, or any other data connection. In general, the communication between one or more computing devices configured with one or more communication devices is accomplished via a network such as any of a number of wireless or hardwired WAN, LAN, SAN, Internet, or other packet-based or port-based communication networks.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein (such as that described in FIG. 5 above) may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In one or more exemplary designs, the functions described may be implemented in hardware, software, firmware, or any combination thereof. If implemented in software, the functions may be stored as one or more instructions or code on a computer-readable medium which are processed/executed by one or more processors.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for task management in a multiprocessor computer system, the method comprising:
   running a task manager on emulated instruction processors (IPs) that are hosted on a host system having actual IPs;
   binding one or more of the host system's actual IPs to one or more of the emulated IPs; and
   performing affinity-based task management by said task manager for managing tasks assigned among the host system's actual IPs;
   wherein the task manager executes under the control of a legacy OS having a different instruction set that has been assigned to a particular one or more of the emulated IPs;
   performing said binding for instances fix at least switching queue levels 1, 2, and 3, where switching queue level means there is a switching queue per IP bus, level 2 means there is a switching queue per subpod, and level 3 means there is a switching queue per pod.

2. The method of claim 1 wherein the tasks are processes performed for execution of one or more application programs running on the emulated IPs.

3. The method of claim 1 wherein said performing affinity-based task management by said task manager comprises:
   directly managing, by said task manager, assignment of tasks among the emulated IPs, wherein said binding facilitates indirect management of the assignment of tasks among the host system's actual IPs.

4. The method of claim 1 wherein said task manager is implemented in an operating system (OS) running on said emulated IPs.

5. The method of claim 1 wherein said task manager comprises an affinity dispatcher.

6. The method of claim 5 wherein said task manager further comprises switching queues.

7. The method of claim 1 wherein said emulated IPs have a different instruction set than said host system's actual IPs.

8. The method of claim 1 wherein said binding comprises:
   receiving an affinity ID of each of said host system's actual IPs; and
   associating, by said task manager, said received affinity IDs for one or more of said host system's actual IPs with one or more emulated IDs.

9. The method of claim 1 further comprising:
   performing said binding responsive to a switching queue level being configured to one of levels 1, 2, and 3, where switching queue level 1 means there is a switching queue per IP bus, level 2 means there is a switching queue per subpod, and level 3 means there is a switching queue per pod.

10. A computer program product having a non-transient computer-readable medium having encoded data that when executed by a programmable computing engine implements a method for managing task assignment among a host system's instruction processors (IPs) of a host system by a task manager running on emulated IPs that are hosted on the host system, the computer program product comprising:
    running a task manager on emulated instruction processors (IPs) that are hosted on a host system having actual IPs;
    binding one or more of the host system's actual IPs to one or more of the emulated IPs; and
    performing affinity-based task management by said task manager for managing tasks assigned among the host system's actual IPs;
    wherein the task manager executes under the control of legacy OS having a different instruction set that has been assigned to a particular one or more of the emulated IPs
    performing said binding for instances fix at least switching queue levels 1, 2, and 3, where switching queue level means there is a switching queue per IP bus, level 2 means there is a switching queue per subpod, and level 3 means there is a switching queue per pod.

11. The computer program product of claim 10 wherein the tasks are processes performed for execution of one or more application programs running on the emulated IPs.

12. The computer program product of claim 10 wherein said code for performing affinity-based task management comprises:
    code for directly managing, by said task manager, assignment of tasks among the emulated IPs, wherein said binding facilitates indirect management of the assignment of tasks among the host system's actual IPs.

13. The computer program product of claim 10 wherein said task manager is implemented an operating system (OS) running on said emulated IPs.

14. The computer program product of claim 10 wherein said code for binding comprises:
    code for receiving an affinity of each of said host system's actual IPs; and
    code for associating, by said task manager, said received affinity IDs for one or more of said host system's actual IPs with one or more emulated IPs.

15. A system for task management in a multiprocessor computer system, the system comprising:
    means for binding one or more of a host system's actual instruction processor's (IPs) to one or more emulated IPs that are hosted on the host system; and
    means, running on the emulated IPs for performing affinity-based task management for managing tasks assigned among the host system's actual IPs, wherein the management means directly managing assignment of tasks among the emulated IPs, and wherein the binding means facilitates indirect management of the assignment of tasks among the host system's actual IPs;
    wherein the task manager executes under the control of legacy OS having a different instruction set that has been assigned to a particular one or more of the emulated IPs;
    performing said binding for instances fix at least switching queue levels 1, 2, and 3, where switching queue level means there is a switching queue per IP bus, level 2 means there is a switching queue per subpod, and level 3 means there is a switching queue per pod.

16. The system of claim 15 wherein the tasks are processes performed for execution of one or more application programs running on the emulated IPs; and wherein said management means is implemented in an operating system (OS) running on said emulated IPs.

* * * * *

UNITED STATES PATENT AND TRADEMARK OFFICE
CERTIFICATE OF CORRECTION

PATENT NO. : 8,661,435 B2
APPLICATION NO. : 12/886969
DATED : February 25, 2014
INVENTOR(S) : David W. Schroth et al.

It is certified that error appears in the above-identified patent and that said Letters Patent is hereby corrected as shown below:

Title page, in item (75) one of the inventor's names is misspelled:

Name As Shown on Patent: Michael J. Rieschi

The Correct Spelling of His Name is: Michael J. RIESCHL

Signed and Sealed this
Twelfth Day of July, 2016

Michelle K. Lee
*Director of the United States Patent and Trademark Office*